Figure 1:
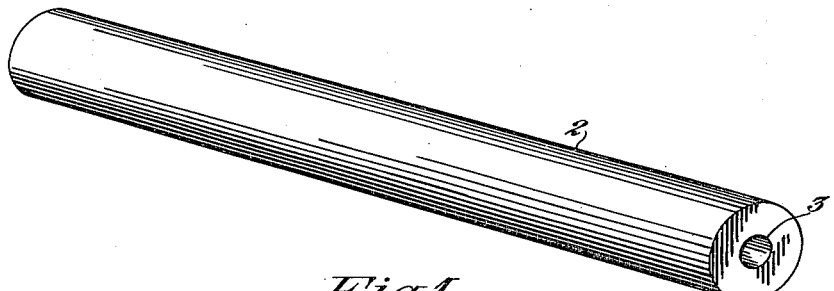

Aug. 21, 1923.

L. H. KIRK 1,465,553

SOLDER FILLED WIRE AND METHOD OF MANUFACTURING SAME

Filed Feb. 25, 1920

Inventor:
Lloyd H. Kirk
By
Attorney.

Patented Aug. 21, 1923.

1,465,553

UNITED STATES PATENT OFFICE.

LLOYD H. KIRK, OF PROVIDENCE, RHODE ISLAND, ASSIGNOR TO MARTIN-COPELAND COMPANY, OF PROVIDENCE, RHODE ISLAND, A TRUSTEESHIP CONSISTING OF EDGAR W. MARTIN, OF BARRINGTON, RHODE ISLAND, LAURENCE C. MARTIN, OF PROVIDENCE, RHODE ISLAND, AND GEORGE W. BLEECKER, OF CHICAGO, ILLINOIS.

SOLDER-FILLED WIRE AND METHOD OF MANUFACTURING SAME.

Application filed February 25, 1920. Serial No. 361,244.

*To all whom it may concern:*

Be it known that I, LLOYD H. KIRK, a citizen of the United States, residing at Providence, in the county of Providence, State of Rhode Island, have invented certain new and useful Improvements in Solder-Filled Wire and Method of Manufacturing Same, of which the following is a specification.

My invention relates to improvements in solder-filled wire for use in the manufacture of articles of jewelry, such as chains, and in the method of producing the same. My improvement is directed particularly to wire-stock which may be cut into suitable lengths and bent into links or other forms with the abutting ends of the wire soldered together by applying heat to the joints.

One object of the improvement is to provide a solder-filled wire in which the solder is prevented from fusing into, or being absorbed by, the gold or other precious metal surrounding it when it is subjected to heat during the soldering operation.

Another object of the improvement is to provide a wire in which the solder will flow more freely and abundantly from the ends when subjected to heat to more securely solder the joints of the links or other parts.

A further object of the improvement is to provide a wire which will be more ductile and pliant, whereby it may be readily bent and twisted into the required shapes without fracturing or rupturing the stock.

Figure 2:
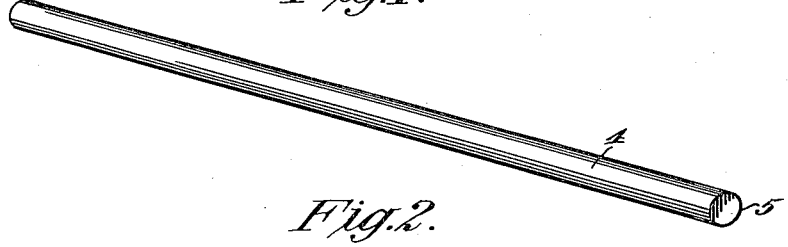
Figures 3, 4:
Figure 5:
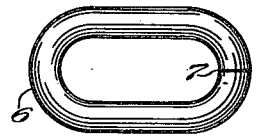

Other objects of the improvement will appear from the description of the invention contained in the following specification which is illustrated by the accompanying drawings. In the drawings:

Fig. 1, is a perspective view of the bar or ingot of gold or other precious metal from which the wire is drawn;

Fig. 2, a similar view of the core of solder which forms the filler for the wire;

Fig. 3, an enlarged view of the finished wire, shown partly in section at one end to illustrate the core of solder and its protecting sheath which separates it from the gold;

Fig. 4, an end view of the same;

Fig. 5, an enlarged view of a chain link formed from the wire; and

Figure 6:
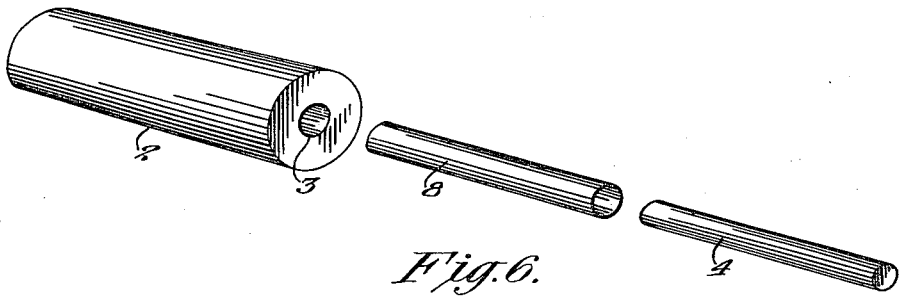

Fig. 6, a composite view showing a modification in the method of applying the sheathing to the solder to separate it from the gold.

In the manufacture of articles of fine jewelry, particularly gold chains, it is the common practice to employ a hollow wire of gold or other precious metal which is filled with a core of solder. The solder acts as a stiffening agent or reinforcement for the gold, whereby the wire may be bent into the required shapes without causing it to buckle, and further serves as the medium for soldering the joints when the wire is bent into a loop or link or united to another part. The chain may be made by hand or in automatic machines by cutting the wire into suitable lengths; bending it into links; looping the links together; and then soldering the abutting ends of the wire at the joints of the links by applying heat thereto. In the manufacture of high grade chains, where the gold or other precious metal is relatively fine, it has been found practically impossible to prevent the solder from fusing into the surrounding metal when the wire is heated during the soldering operation. That is to say, gold of a high degree of fineness is relatively soft and somewhat porous so that when the solder is melted or fused the gold absorbs a portion of it. Where the solder is taken up or absorbed by the gold it will not flow as freely as required to the joint being soldered and hence the ends of the wire will not be securely united.

To prevent this absorption of the solder by the precious metal surrounding it, and to provide a wire which may be more readily and securely soldered at the joinder of its ends, I have devised a new and improved method of separating or insulating the solder from the gold or other precious metal as next explained: Referring to the drawings, 2 designates an ingot of gold or other precious metal which may be cast by the usual method in a cylindrical mold. A suitable core may be placed at the center of the mold during the process of casting the metal so as to form a cylindrical bore 3 extending longitudinally of the bar or ingot 2, and adapted to receive the filling of solder; or, if preferred, the ingot 2 may be cast solid and afterward drilled to provide the bore 3.

After the ingot is cast a steel mandrel is usually driven into its bore 3 and the ingot is then subjected to a rolling operation. The rolling action acts to smooth and straighten the bore 3, to remove any irregularities in the casting, and to further reduce the metal to a more uniform density in all its parts.

After the ingot or blank 2 has been prepared in the above described manner, or by any other suitable method, the filling or core of solder may be applied to its bore 3 as follows: Referring to Fig. 2 of the drawings, 4 designates a cylindrical strip or wire of solder which is preferably of slightly less diameter than that of the bore 3 in the ingot 2. To this solder wire 4 I apply a coating 5 of a relatively dense or substantially impervious material or metal which serves as the protecting sheath to separate the solder from the gold. I have found that a thin coating of copper serves the purpose intended very satisfactorily, and a layer of the copper may be conveniently deposited on the surface of the solder by the usual electro-plating process. One advantage in using a copper coating is due to the fact that this metal possesses a high degree of thermal conductivity, and hence it acts not only to confine the solder, but also to transmit the heat to the solder to cause it to fuse quickly. It is to be understood, however, that I do not limit myself solely to the use of this metal since other materials of an impenetrable or impervious nature having heat-resisting properties could be employed for the same purpose of separating the solder from the gold. For instance, I may use a coating of graphite, heat-proof paint or other compositions for protecting the precious metal from the solder.

After the strip or wire of solder has been coated or plated with its protecting sheath 5, the core 4 is forced or driven into the bore 3 of the ingot 2 to form a substantially integral filling therefor. The ingot or blank 2 is then placed in a wire-drawing machine and drawn down to the required diameter, which varies in accordance with the use to which the wire-stock is to be put. Fig. 3 illustrates a length of the finished wire with its laminated structure shown in section at one end, and Fig. 4 is an end view of the same, both of these views being considerably enlarged to show the component parts of the wire. Fig. 5 illustrates the formed link 6 which is soldered at the joint 7.

In Fig. 6 I have illustrated another method of producing the improved wire which consists in the following steps: The ingot or blank 2 is cast as above described, or otherwise formed with an axial bore 3 for receiving the solder core, and the bore may be lined with copper or other suitable metal by inserting a relatively thin tube 8 thereinto. The tube 8 may be placed on a rod or mandrel and driven or forced into the bore 3 of the ingot and the solder core afterward forced into the tube. If preferred, the solder may be melted and poured into the tube, and the unitary core then forced or driven into the bore 3; or any other method of uniting the parts of the structure may be employed to obtain the result desired. For instance, as a further modification of the process of lining the ingot I may first coat or electro-plate the interior of the bore 3 of the ingot 2 with copper or a similar impervious material, and afterward pour or force the solder into it. In other instances the wire of solder may be first plated or sheathed with a thin layer of copper, and the gold or other precious metal then deposited onto it by electro-plating, or rolled around it in suitable forming dies.

While I have herein shown and described my improved wire-stock as being circular in cross-section, it is to be understood that it may be produced in other shapes, such for instance as oval, flat, rectangular, or polygonal forms.

My improved wire-stock is adapted for various uses in jewelry manufacture and kindred arts and is an important improvement over the ordinary type of wire as previously constructed. A particular advantage effected by the separation of the solder from the gold or other precious metal in the wire is that the solder is prevented from being absorbed thereby. For this reason my improved wire may be more securely soldered either at its joinder to other parts or at the joints of the links in the chain, because the solder will flow freely and abundantly from the ends of the wire. Another important advantage in the use of my improved wire results from the fact that it is more ductile and pliant and can be bent or twisted without causing its rupture or fracture. The gold or other precious metal being preserved in its natural state is prevented from becoming brittle after heating and hence the links or other articles formed from the wire may be further worked after the soldering operation. This is of utmost importance in manufacturing curb chain, the twisting or curbing of the links of the chain being done after they are looped together. I have found that chains manufactured from my improved wire may be curbed without the least danger of fracturing or splitting the gold, whereas with other types of wire the chain cannot be curbed without danger of breaking or damaging the links.

I believe I am the first to provide a wire for the purpose above described in which the gold or other precious metal is separated and protected from the solder core or filler to prevent the solder from fusing into the gold or being absorbed thereby; therefore

I claim this feature broadly both as regards the article itself and the method of producing it. I claim and desire to secure by Letters Patent of the United States:

1. An improved solder-filled wire for use in jewelry manufacture or kindred arts comprising a hollow body of precious metal, a core of solder contained therein, and a thin sheath of impenetrable material enclosing the solder core to separate it from the precious metal to prevent it from being absorbed thereby.

2. As a new article of manufacture, a composite stock for use in jewelry manufacture or kindred arts consisting in a laminated structure having an outer layer comprising a substantial thickness of precious metal; a layer of solder underlying the precious metal contiguous thereto; and a thin sheath of substantially impenetrable material overlying the solder to separate it from the precious metal to prevent it from being absorbed thereby.

3. An improved solder-filled wire for use in jewelry manufacture or kindred arts comprising a hollow body of gold, a core of solder, and a sheath of copper enclosing the solder to separate it from the gold to prevent it from being absorbed thereby.

4. An improved method of forming wire-stock for use in the manufacture of jewelry consisting in providing an ingot of precious metal having an axial bore, filling the bore with a solid core of solder while providing a sheath of impervious material entirely separating the solder from the precious metal of the ingot, and finally drawing the ingot down into a wire.

5. An improved method of producing wire-stock for use in jewelry manufacture or kindred arts consisting in providing a hollow blank of precious metal and a core of solder; applying a layer of substantially impervious material to the exterior of the core; inserting the core in the blank; and drawing the blank down into a wire having the solder separated from the precious metal to prevent it from being absorbed thereby.

6. That method of producing wire-stock for use in jewelry manufacture or kindred arts which consists in providing a core of solder; coating the core on its exterior with a substantially impervious material; applying a body of precious metal around the coated core and forming the composite structure into a wire.

7. That method of producing wire-stock for use in jewelry manufacture and kindred arts which consists in providing a core of solder; electro-plating the surface of the core with copper; applying a body of precious metal around the core; and forming the composite structure into a wire.

In testimony whereof I affix my signature.

LLOYD H. KIRK.